US009635220B2

(12) United States Patent
Foi et al.

(10) Patent No.: US 9,635,220 B2
(45) Date of Patent: Apr. 25, 2017

(54) METHODS AND SYSTEMS FOR SUPPRESSING NOISE IN IMAGES

(71) Applicants: FLIR Systems, Inc., Wilsonville, OR (US); Noiseless Imaging Oy Ltd., Tampere (FI)

(72) Inventors: Alessandro Foi, Tampere (FI); Matteo Tiziano Maggioni, Tampere (FI)

(73) Assignees: FLIR Systems, Inc., Wilsonville, OR (US); Noiseless Imaging Oy LTD, Tampere (FI)

( * ) Notice: Subject to any disclaimer, the term of this patent is extended or adjusted under 35 U.S.C. 154(b) by 478 days.

(21) Appl. No.: 13/943,035

(22) Filed: Jul. 16, 2013

(65) Prior Publication Data
US 2014/0015921 A1  Jan. 16, 2014

Related U.S. Application Data

(60) Provisional application No. 61/672,010, filed on Jul. 16, 2012.

(51) Int. Cl.
*H04N 5/21* (2006.01)
*G06T 5/00* (2006.01)
(Continued)

(52) U.S. Cl.
CPC .............. *H04N 5/21* (2013.01); *G06T 5/002* (2013.01); *H04N 5/217* (2013.01); *H04N 5/33* (2013.01);
(Continued)

(58) Field of Classification Search
CPC . G06T 2207/10016; G06T 2207/10048; G06T 2207/20182; G06T 5/002; H04N 5/21; H04N 5/217; H04N 5/33
See application file for complete search history.

(56) References Cited

U.S. PATENT DOCUMENTS

| | | | | | |
|---|---|---|---|---|---|
| 4,972,260 | A | * | 11/1990 | Fujikawa | H04N 19/139 375/240.03 |
| 5,157,732 | A | * | 10/1992 | Ishii | G06T 7/2013 348/699 |

(Continued)

FOREIGN PATENT DOCUMENTS

| | | |
|---|---|---|
| CN | 2874947 | 2/2007 |
| CN | 2899321 | 5/2007 |

(Continued)

OTHER PUBLICATIONS

Yang, Adaptive Filtering Techniques for Acquisition Noise and Coding Artifacts or Digital Pictures, Aug. 2010, RMIT University, pp. 1-160.*

(Continued)

*Primary Examiner* — Peter D Le
(74) *Attorney, Agent, or Firm* — Haynes and Boone, LLP

(57) ABSTRACT

Various techniques are disclosed to effectively suppress noise in images (e.g., video or still images). For example, noise in images may be more accurately modeled as having a structured random noise component and a structured fixed pattern noise (FPN) component. Various parameters of noise may be estimated robustly and efficiently in real time and in offline processing. Noise in images may be filtered adaptively, based on various noise parameters and motion parameters. Such filtering techniques may effectively suppress noise even in images that have a prominent FPN component, and may also improve effectiveness of other operations that may be affected by noise.

25 Claims, 6 Drawing Sheets

(51) Int. Cl.
*H04N 5/217* (2011.01)
*H04N 5/33* (2006.01)

(52) U.S. Cl.
CPC .......... *G06T 2207/10016* (2013.01); *G06T 2207/10048* (2013.01); *G06T 2207/20182* (2013.01)

(56) References Cited

U.S. PATENT DOCUMENTS

| | | | |
|---|---|---|---|
| 5,598,482 A * | 1/1997 | Balasubramanian | H04N 1/40 382/163 |
| 5,887,084 A * | 3/1999 | Wober | G06F 17/141 382/240 |
| 5,943,170 A * | 8/1999 | Inbar | G06E 3/005 359/561 |
| 6,122,314 A * | 9/2000 | Bruls | H04N 5/21 348/608 |
| 6,211,515 B1 * | 4/2001 | Chen | H04N 5/2353 250/252.1 |
| 6,348,951 B1 | 2/2002 | Kim | |
| 6,396,543 B1 | 5/2002 | Shin et al. | |
| 6,424,843 B1 | 7/2002 | Reitmaa et al. | |
| 6,633,231 B1 | 10/2003 | Okamoto et al. | |
| 6,681,120 B1 | 1/2004 | Kim | |
| 6,911,652 B2 | 6/2005 | Walkenstein | |
| D524,785 S | 7/2006 | Huang | |
| 7,084,857 B2 | 8/2006 | Lieberman et al. | |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim | |
| 7,333,832 B2 | 2/2008 | Tsai et al. | |
| 7,362,911 B1 * | 4/2008 | Frank | H04N 5/365 348/E5.081 |
| 7,377,835 B2 | 5/2008 | Parkulo et al. | |
| 7,477,309 B2 | 1/2009 | Cuccias | |
| 7,567,818 B2 | 7/2009 | Pylkko | |
| 7,575,077 B2 | 8/2009 | Priepke et al. | |
| 7,595,904 B2 | 9/2009 | Lapstun et al. | |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |
| 7,900,842 B2 | 3/2011 | Silverbrook et al. | |
| 7,903,152 B2 | 3/2011 | Kim | |
| 7,947,222 B2 | 5/2011 | Bae et al. | |
| 2002/0171737 A1 * | 11/2002 | Tullis | H04N 1/00204 348/143 |
| 2003/0122957 A1 | 7/2003 | Emme | |
| 2004/0028286 A1 * | 2/2004 | Saigusa | H04N 1/407 382/264 |
| 2004/0127156 A1 | 7/2004 | Park | |
| 2004/0157612 A1 | 8/2004 | Kim | |
| 2004/0179738 A1 * | 9/2004 | Dai | G06T 7/0002 382/218 |
| 2004/0212703 A1 * | 10/2004 | Sugimoto | H04N 5/335 348/241 |
| 2005/0067852 A1 | 3/2005 | Jeong | |
| 2005/0105627 A1 * | 5/2005 | Sun | H04N 5/21 375/240.29 |
| 2005/0107982 A1 * | 5/2005 | Sun | G06T 5/002 702/179 |
| 2005/0248912 A1 | 11/2005 | Kang et al. | |
| 2005/0277447 A1 | 12/2005 | Buil et al. | |
| 2006/0038826 A1 * | 2/2006 | Daly | G09G 3/2048 345/598 |
| 2006/0039686 A1 | 2/2006 | Soh et al. | |
| 2006/0060984 A1 | 3/2006 | Wakabayashi et al. | |
| 2006/0077246 A1 | 4/2006 | Kawakami et al. | |
| 2006/0097172 A1 | 5/2006 | Park | |
| 2006/0147191 A1 | 7/2006 | Kim | |
| 2006/0154559 A1 | 7/2006 | Yoshida | |
| 2006/0164699 A1 * | 7/2006 | Inoue | H04N 1/4058 358/515 |
| 2006/0234744 A1 | 10/2006 | Sung et al. | |
| 2006/0240867 A1 | 10/2006 | Wang et al. | |
| 2006/0285907 A1 | 12/2006 | Kang et al. | |
| 2007/0019077 A1 | 1/2007 | Park | |
| 2007/0019099 A1 | 1/2007 | Lieberman et al. | |
| 2007/0019103 A1 | 1/2007 | Lieberman et al. | |
| 2007/0033309 A1 | 2/2007 | Kuwabara et al. | |
| 2007/0034800 A1 | 2/2007 | Huang | |
| 2007/0057764 A1 | 3/2007 | Sato et al. | |
| 2007/0120879 A1 | 5/2007 | Kanade et al. | |
| 2007/0189583 A1 | 8/2007 | Shimada et al. | |
| 2007/0211965 A1 | 9/2007 | Helbing et al. | |
| 2007/0274541 A1 | 11/2007 | Uetake et al. | |
| 2007/0299226 A1 | 12/2007 | Park et al. | |
| 2008/0025630 A1 * | 1/2008 | Hofman | G06K 9/40 382/260 |
| 2008/0038579 A1 | 2/2008 | Schuisky et al. | |
| 2008/0151056 A1 | 6/2008 | Ahamefula | |
| 2008/0248833 A1 | 10/2008 | Silverbrook et al. | |
| 2008/0266079 A1 | 10/2008 | Lontka | |
| 2008/0266413 A1 * | 10/2008 | Cohen | H04N 5/23229 348/222.1 |
| 2008/0278607 A1 * | 11/2008 | Zhang | G06T 5/002 348/241 |
| 2008/0278772 A1 | 11/2008 | Silverbrook et al. | |
| 2008/0292144 A1 | 11/2008 | Kim | |
| 2008/0297614 A1 | 12/2008 | Lieberman et al. | |
| 2009/0021611 A1 * | 1/2009 | Utsugi | H04N 1/401 348/241 |
| 2009/0023421 A1 | 1/2009 | Parkulo et al. | |
| 2009/0040042 A1 | 2/2009 | Lontka | |
| 2009/0131104 A1 | 5/2009 | Yoon | |
| 2009/0215479 A1 | 8/2009 | Karmarkar | |
| 2009/0227287 A1 | 9/2009 | Kotidis | |
| 2009/0238238 A1 | 9/2009 | Hollander et al. | |
| 2009/0278048 A1 | 11/2009 | Choe et al. | |
| 2009/0297062 A1 | 12/2009 | Molne et al. | |
| 2010/0090983 A1 | 4/2010 | Challener et al. | |
| 2010/0103141 A1 | 4/2010 | Challener et al. | |
| 2010/0113068 A1 | 5/2010 | Rothschild | |
| 2010/0131268 A1 | 5/2010 | Moeller | |
| 2010/0144387 A1 | 6/2010 | Chou | |
| 2010/0163730 A1 | 7/2010 | Schmidt et al. | |
| 2010/0234067 A1 | 9/2010 | Silverbrook et al. | |
| 2010/0245582 A1 | 9/2010 | Harel | |
| 2010/0245585 A1 | 9/2010 | Fisher et al. | |
| 2010/0314543 A1 | 12/2010 | Lee et al. | |
| 2011/0043486 A1 | 2/2011 | Hagiwara et al. | |
| 2011/0050969 A1 * | 3/2011 | Nishihara | G01J 1/44 348/296 |
| 2011/0063446 A1 | 3/2011 | McMordie et al. | |
| 2011/0102599 A1 | 5/2011 | Kwon et al. | |
| 2011/0117532 A1 | 5/2011 | Relyea et al. | |
| 2011/0121978 A1 | 5/2011 | Schwörer et al. | |
| 2011/0122075 A1 | 5/2011 | Seo et al. | |
| 2011/0128384 A1 | 6/2011 | Tiscareno et al. | |
| 2012/0075506 A1 * | 3/2012 | van Beek | H04N 5/2173 348/241 |
| 2012/0099001 A1 * | 4/2012 | Oyama | G06T 5/003 348/234 |

FOREIGN PATENT DOCUMENTS

| | | |
|---|---|---|
| CN | 201203922 | 3/2009 |
| CN | 101635754 | 1/2010 |
| CN | 101859209 | 10/2010 |
| CN | 101945154 | 1/2011 |
| CN | 102055836 | 5/2011 |

(56) References Cited

FOREIGN PATENT DOCUMENTS

| | | |
|---|---|---|
| JP | 2004048571 | 2/2004 |
| JP | 2006098098 | 4/2006 |
| JP | 2007325842 | 12/2007 |
| KR | 100227582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010050263 | 6/2001 |
| KR | 20010068202 | 7/2001 |
| KR | 20010070355 | 7/2001 |
| KR | 20020006967 | 1/2002 |
| KR | 20020061920 | 7/2002 |
| KR | 20020078469 | 10/2002 |
| KR | 20020083961 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030051140 | 6/2003 |
| KR | 20030056667 | 7/2003 |
| KR | 20030085742 | 11/2003 |
| KR | 20030088968 | 11/2003 |
| KR | 20040001684 | 1/2004 |
| KR | 20040001686 | 1/2004 |
| KR | 20040027692 | 4/2004 |
| KR | 20040033223 | 4/2004 |
| KR | 20040033532 | 4/2004 |
| KR | 20040033986 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 20040064855 | 7/2004 |
| KR | 20040066724 | 7/2004 |
| KR | 20040068864 | 8/2004 |
| KR | 20040076308 | 9/2004 |
| KR | 20040086994 | 10/2004 |
| KR | 20040102386 | 12/2004 |
| KR | 20050011313 | 1/2005 |
| KR | 20050012505 | 2/2005 |
| KR | 20050014448 | 2/2005 |
| KR | 20050015293 | 2/2005 |
| KR | 20050015745 | 2/2005 |
| KR | 20050018370 | 2/2005 |
| KR | 20050023950 | 3/2005 |
| KR | 101006660 | 9/2005 |
| KR | 20060023957 | 3/2006 |
| KR | 100645746 | 5/2006 |
| KR | 100633792 | 10/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 20070002590 | 1/2007 |
| KR | 20070005263 | 1/2007 |
| KR | 20070009380 | 1/2007 |
| KR | 20070028201 | 3/2007 |
| KR | 100729813 | 6/2007 |
| KR | 20070067650 | 6/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 20070115754 | 12/2007 |
| KR | 20070122344 | 12/2007 |
| KR | 20070122345 | 12/2007 |
| KR | 20080013314 | 2/2008 |
| KR | 20080015099 | 2/2008 |
| KR | 20080015100 | 2/2008 |
| KR | 100822053 | 4/2008 |
| KR | 20080045551 | 5/2008 |
| KR | 100841243 | 6/2008 |
| KR | 20080054596 | 6/2008 |
| KR | 20080069007 | 7/2008 |
| KR | 20080071070 | 8/2008 |
| KR | 20080078315 | 8/2008 |
| KR | 100866475 | 11/2008 |
| KR | 100866476 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090018486 | 2/2009 |
| KR | 20090020864 | 2/2009 |
| KR | 20090036734 | 4/2009 |
| KR | 100901784 | 6/2009 |
| KR | 20090105424 | 10/2009 |
| KR | 20100059681 | 6/2010 |
| KR | 20100070119 | 6/2010 |
| KR | 20100072994 | 7/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 20100123021 | 11/2010 |
| KR | 20110006437 | 1/2011 |
| KR | 20110011264 | 2/2011 |
| KR | 2011024290 | 3/2011 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |

OTHER PUBLICATIONS

Foi, et al., Image denoising by sparse 3D transform-domain collaborative filtering, Aug. 2007, IEEE Transactions on image processing, vol. 16, No. 8.*

Maggioni et al., "Video denoising using separable 4-D nonlocal spatiotemporal transforms", Image Processing: Algorithms and Systems, Feb. 10, 2011, pp. 1-11, vol. 7870, No. 1, Bellingham, WA.

Romanenko et al. "Block matching noise reduction method for photographic images, applied in Bayer RAW domain, optimized for real-time implementation", Proceedings of Spie, Apr. 26, 2012, pp. 1-14, vol. 8437.

* cited by examiner

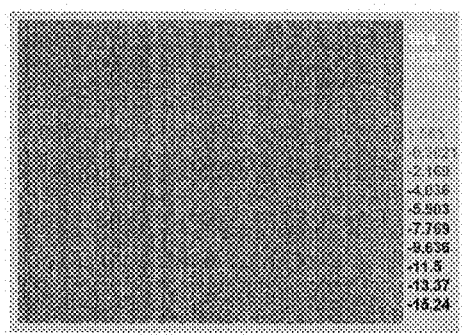
FIG. 2A
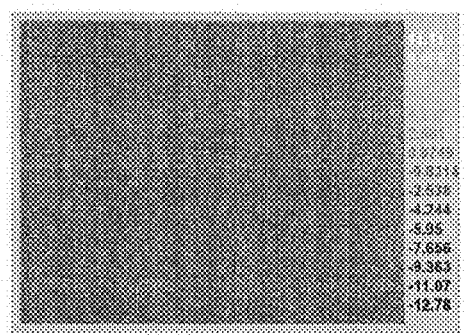
FIG. 2B
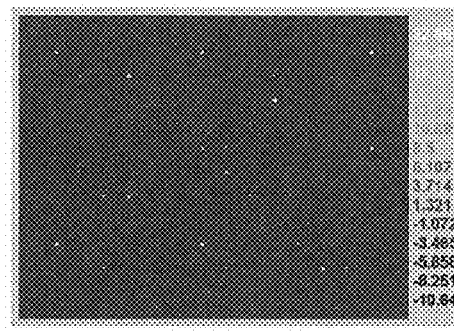
FIG. 2C
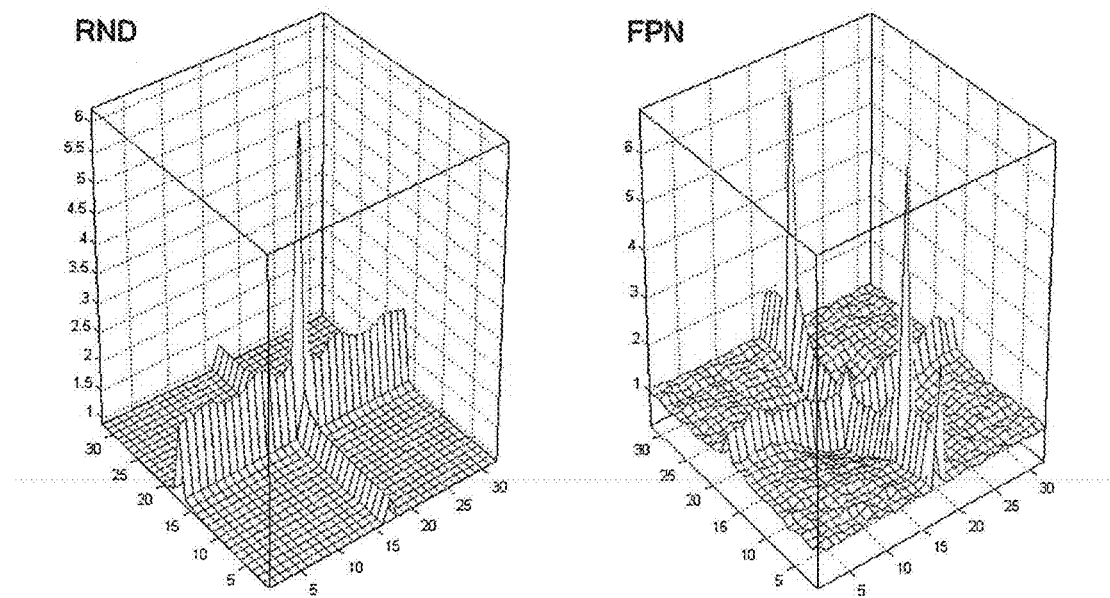
FIG. 3A
FIG. 3B

| PSD of random noise in 4×4 2-D transform domain | PSD of FPN in 4×4 2-D transform domain | PSD of random noise in 8×8 2-D transform domain | PSD of FPN in 8×8 2-D transform domain |

# METHODS AND SYSTEMS FOR SUPPRESSING NOISE IN IMAGES

CROSS-REFERENCE TO RELATED APPLICATIONS

This patent application claims the benefit of and priority to U.S. Provisional Patent Application No. 61/672,010 filed on Jul. 16, 2012, which is incorporated herein by reference in its entirety.

TECHNICAL FIELD

One or more embodiments of the invention relate generally to digital imaging processing and more particularly, for example, to noise suppression in images.

BACKGROUND

Noise is one of the main causes of degradation in images (e.g., video and still images) captured by image sensors. Conventional noise filtering techniques typically apply various averaging or smoothing operations to suppress noise, under the assumption that noise is random and unstructured such that it can be canceled out by averaging or smoothing.

However, the assumption of unstructured randomness of noise is not accurate. In fact, noise may include both a fixed pattern noise (FPN) component (e.g., due to column noise in readout circuitry, irregular pixel sizes, and/or other irregularities) and a random noise component. The FPN component may appear as a noisy pattern that is essentially constant through time, and as such it is not attenuated by averaging, but often becomes even more visible after conventional noise filtering. The FPN becomes more problematic for low-cost sensors, sensors with extremely narrow pixel-pitch, or sensors operating in implementations with a very low signal-to-noise ratios (SNRs) (e.g., in low-light imaging, thermal imaging, range imaging, or other imaging applications with low SNRs). Furthermore, for most imagers, both the FPN and random noise components are typically structured (e.g., colored noise), with different correlations present in the FPN and random noise components. Thus, conventional filtering techniques often produce images with prominent structured artifacts.

SUMMARY

Various techniques are disclosed to effectively suppress noise in images (e.g., video or still images). For example, noise in images may be more accurately modeled as having a structured random noise component and a structured fixed pattern noise (FPN) component. Various parameters of noise may be estimated robustly and efficiently in real time and in offline processing. Noise in images may be filtered adaptively, based on various noise parameters and motion parameters. Such filtering techniques may effectively suppress noise even in images that have a prominent FPN component, and may also improve effectiveness of other operations that may be affected by noise.

In one embodiment, a method includes receiving a plurality of video image frames; constructing a plurality of spatiotemporal volumes by grouping a plurality of image blocks extracted from the video image frames; filtering the spatiotemporal volumes, wherein the filtering models both a power spectral density (PSD) of a random noise (RND) component and a PSD of a fixed pattern noise (FPN) component in the video image frames to suppress both types of noise; and aggregating the image blocks from the filtered spatiotemporal volumes to generate a plurality of filtered video image frames.

In another embodiment, a system includes a video interface configured to receive a plurality of video image frames; a processor in communication with the video interface and configured to construct a plurality of spatiotemporal volumes by grouping a plurality of image blocks extracted from the video image frames, filter the spatiotemporal volumes, wherein the filtering models both a power spectral density (PSD) of a random noise (RND) component and a PSD of a fixed pattern noise (FPN) component in the video image frames to suppress both types of noise, and aggregate the image blocks from the filtered spatiotemporal volumes to generate a plurality of filtered video image frames; and a memory in communication with the processor and configured to store the video image frames.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 2A-2B illustrate examples of random noise in video images in accordance with an embodiment of the disclosure.

FIG. 2C illustrates an example of fixed pattern noise (FPN) in video images in accordance with an embodiment of the disclosure.

FIGS. 3A and 3B illustrate graphs representing examples of power spectral densities of random noise and FPN components, respectively, in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
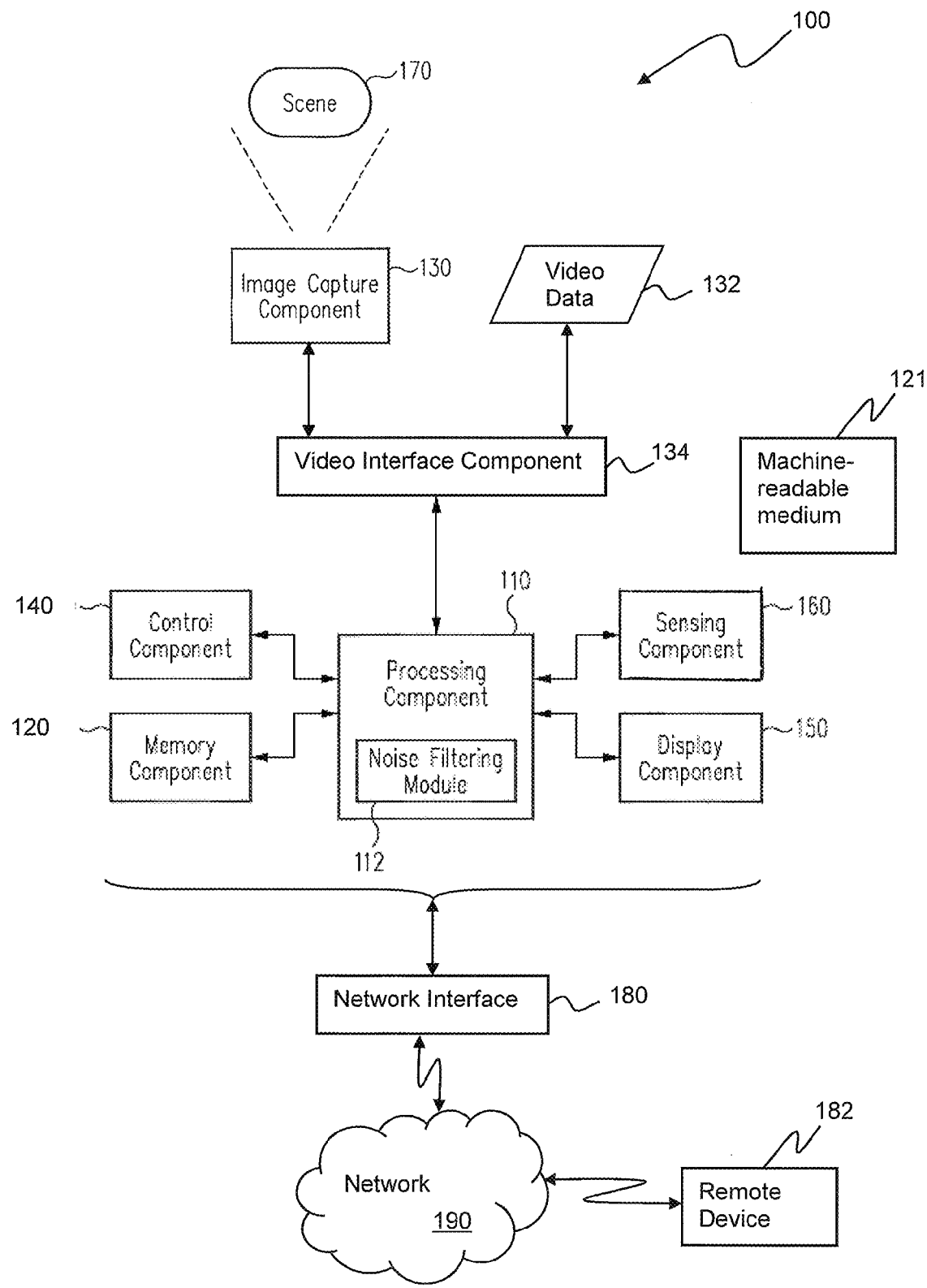
FIG. 1 illustrates a block diagram of a video processing system in accordance with an embodiment of the disclosure.

Various embodiments of methods and systems disclosed herein may be used to model random noise and FPN to suppress both types of noise in images (e.g., video or still images). More specifically, in one or more embodiments, methods and systems may permit effective suppression of noise even in images that have a prominent FPN component, by modeling noise more accurately to comprise both random noise and FPN components, estimating one or more noise parameters, filtering images based on motion-adaptive parameters, and/or performing other operations described herein.

In one aspect of methods and systems disclosed herein, filtering may be performed on spatiotemporal volumes, any one of which may be constructed by grouping image blocks (e.g., a fixed-size portion or patch of a video image frame) extracted from a sequence of video image frames along a motion trajectory. Because different image blocks in such a spatiotemporal volume may belong to different spatial positions on a video image, FPN may be revealed as random noise in the volume, and thus may be modeled and filtered as such. If there is little or no motion, different image blocks may be aligned (e.g., belong to the same spatial positions on video image frames) and thus FPN may be preserved as such in the spatiotemporal volumes. In this regard, various embodiments of the disclosure may effectively suppress FPN by adaptively filtering the spatiotemporal volumes based not only on various noise parameters, but also on the relative motion captured in the spatiotemporal volumes, as further described herein.

In another aspect of methods and systems disclosed herein, one or more noise parameters associated with both FPN and random noise may be estimated using video images to be processed and/or other video images that may be used for purposes of estimating noise parameters, according to various embodiments of the disclosure.

Thus, in various embodiments, filtering operations may be adaptively performed on the spatiotemporal volumes based on the estimated noise parameters and the motion captured in the volumes (e.g., relative spatial alignment of image blocks from frame to frame). In some embodiments, such filtering operations may be efficiently performed by applying a three-dimensional (3-D) transform (e.g., a discrete cosine transform (DCT), discrete sine transform (DST), discrete wavelet transform (DWT), or other orthogonal transforms) to the spatiotemporal volumes to obtain 3-D spectra, modifying (e.g., adjusting, adaptively shrinking) coefficients of the 3-D spectra, and applying an inverse transform to obtain filtered spatiotemporal volumes. Image blocks from the filtered spatiotemporal volumes may be aggregated (e.g., combined or averaged using adaptive or non-adaptive weights) to construct filtered video image frames. Video image frames in some embodiments may be a set of discrete still images, which can be utilized to provide digital still images (e.g., as digital photographs captured by a digital camera).

Therefore, for example, various embodiments of methods and systems disclosed herein may be included in or implemented as various devices and systems such as infrared imaging devices, mobile digital cameras, video surveillance systems, video processing systems, or other systems or devices that may need to obtain acceptable quality video images from video images impaired by noise (e.g., captured by infrared image sensors or other sensors operating at a low signal-to-noise ratio regime). Furthermore, various techniques disclosed herein not limited to providing noise suppression, but may further beneficially improve performance of various other video processing operations such as enhancement, restoration, deblurring, equalization, sharpening, super-resolution, and other operations that can be impaired by noise, as well as performance of high-level analytics such as object detection, object identification, target tracking, segmentation, scene tracking, and other analytics operations.

FIG. 1 shows a block diagram of a system 100 (e.g., an infrared camera) for capturing and/or processing video images in accordance with an embodiment of the disclosure. The system 100 comprises, in one implementation, a processing component 110, a memory component 120, an image capture component 130, a video interface component 134, a control component 140, a display component 150, a sensing component 160, and/or a network interface 180.

System 100 may represent an imaging device, such as a video camera, to capture and/or process images, such as video images of a scene 170. In one embodiment, system 100 may be implemented as an infrared camera configured to detect infrared radiation and provide representative data and information (e.g., infrared image data of a scene). For example, system 100 may represent an infrared camera that is directed to the near, middle, and/or far infrared spectrums. In some embodiments, image data captured and/or processed by system 100 may comprise non-uniform data (e.g., real image data that is not from a shutter or black body) of the scene 170, for processing, as set forth herein. System 100 may comprise a portable device and may be incorporated, for example, into a vehicle (e.g., an automobile or other type of land-based vehicle, an aircraft, or a spacecraft) or a non-mobile installation requiring infrared images to be stored and/or displayed.

In various embodiments, processing component 110 comprises a processor, such as one or more of a microprocessor, a single-core processor, a multi-core processor, a microcontroller, a logic device (e.g., a programmable logic device (PLD) configured to perform processing functions), a digital signal processing (DSP) device, etc. Processing component 110 may be adapted to interface and communicate with various other components of system 100 perform method and processing steps and/or operations, as described herein. Processing component 110 may include a noise filtering module 112 configured to implement a noise suppression and/or removal operation such as discussed in reference to FIGS. 2A-11B). In one aspect, processing component 110 may be configured to perform various other image processing algorithms including scaling and/or converting image data, either as part of or separate from the noise filtering operation.

It should be appreciated that noise filtering module 112 may be integrated in software and/or hardware as part of processing component 110, with code (e.g., software or configuration data) for noise filtering module 112 stored, for example, in memory component 120. Embodiments of the noise filtering operation as disclosed herein, may be stored by a separate machine-readable medium 121 (e.g., a memory, such as a hard drive, a compact disk, a digital video disk, or a flash memory) to be executed by a computer (e.g., a logic or processor-based system) to perform various methods and operations disclosed herein. In one aspect, machine-readable medium 121 may be portable and/or located separate from system 100, with the stored noise filtering operation provided to system 100 by coupling the computer-readable medium to system 100 and/or by system 100 downloading (e.g., via a wired link and/or a wireless link) the noise filtering operation from computer-readable medium 121.

Memory component 120 comprises, in one embodiment, one or more memory devices configured to store data and information, including video image data and information. Memory component 120 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory. Processing component 110 may be configured to execute software stored in memory component 120 so as to perform method and process steps and/or operations described herein. Processing component 110 may be configured to store in memory component 120 video image data captured by image capture component 130 and/or received via video interface component 134. Processing component 110 may be configured to store processed (e.g., filtered) video image data in memory component 120.

Image capture component 130 may comprise, in various embodiments, one or more image sensors for capturing image data (e.g., still image data and/or video data) representative of an image, such as scene 170. In one embodiment, image capture component 130 may comprise one or more infrared sensors (e.g., any type of multi-pixel infrared detector, such as a focal plane array) for capturing thermal image data (e.g., thermal still image data and/or thermal video data) representative of an image, such as scene 170. In one embodiment, the infrared sensors of image capture component 130 may provide for representing (e.g., converting) the captured image data as digital data (e.g., via an analog-to-digital converter included as part of the infrared sensor or separate from the infrared sensor as part of the system 100). In another embodiment, digital conversion and/or other interfacing may be provided at video interface component 134.

In one aspect, video and/or still image data (e.g., thermal video data) may comprise non-uniform data (e.g., real image data) of an image, such as scene 170. Video and/or still image data may also comprise, in some embodiments, uniform data (e.g., image data of a shutter or a reference black body) that may be utilized, for example, as calibration video and/or calibration image data. Processing component 110 may be configured to process the captured image data (e.g., to provide processed image data), store the image data in the memory component 120, and/or retrieve stored image data from memory component 120. For example, processing component 110 may be adapted to process thermal image data stored in memory component 120 to provide processed (e.g., filtered) image data and information.

Video interface component 134 may include, in some embodiments, appropriate input ports, connectors, switches, and/or circuitry configured to interface with external devices (e.g., remote device 182 and/or other devices) to receive video data (e.g., video data 132) generated by or otherwise stored at the external devices. The received video data may be provided to processing component 110. In this regard, the received video data may be converted into signals or data suitable for processing by processing component 110. For example, in one embodiment, video interface component 134 may be configured to receive analog video data and convert it into suitable digital data to be provided to processing component 110. In one aspect of this embodiment, video interface component 134 may comprise various standard video ports, which may be connected to a video player, a video camera, or other devices capable of generating standard video signals, and may convert the received video signals into digital video/image data suitable for processing by processing component 110. In some embodiments, video interface component 134 may be also configured to interface with and receive image data from image capture component 130. In other embodiments, image capture component 130 may interface directly with processing component 110.

Control component 140 comprises, in one embodiment, a user input and/or interface device, such as a rotatable knob (e.g., potentiometer), push buttons, slide bar, keyboard, and/or other devices, that is adapted to generate a user input control signal. Processing component 110 may be adapted to sense control input signals from a user via control component 140 and respond to any sensed control input signals received therefrom. Processing component 110 may be adapted to interpret such a control input signal as a value, as generally understood by one skilled in the art. In one embodiment, control component 140 may comprise a control unit (e.g., a wired or wireless handheld control unit) having push buttons adapted to interface with a user and receive user input control values. In one implementation, the push buttons of the control unit may be used to control various functions of system 100, such as autofocus, menu enable and selection, field of view, brightness, contrast, noise filtering, image enhancement, and/or various other features.

Display component 150 comprises, in one embodiment, an image display device (e.g., a liquid crystal display (LCD)) or various other types of generally known video displays or monitors. Processing component 110 may be adapted to display image data and information on display component 150. Processing component 110 may be adapted to retrieve image data and information from memory component 120 and display any retrieved image data and information on display component 150. Display component 150 may comprise display circuitry, which may be utilized by the processing component 110 to display image data and information (e.g., filtered thermal images). Display component 150 may be adapted to receive image data and information directly from image capture component 130 via processing component 110 and/or video interface component 134, or the image data and information may be transferred from memory component 120 via processing component 110.

Sensing component 160 comprises, in one embodiment, one or more sensors of various types, depending on the application or implementation requirements, as would be understood by one skilled in the art. Sensors of sensing component 160 provide data and/or information to at least processing component 110. In one aspect, processing component 110 may be adapted to communicate with sensing component 160 (e.g., by receiving sensor information from sensing component 160) and with image capture component 130 (e.g., by receiving data and information from the image capture component 130 and providing and/or receiving command, control, and/or other information to and/or from one or more other components of the system 100).

In various implementations, sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. Sensing component 160 may represent conventional sensors as generally known by one skilled in the art for monitoring various conditions (e.g., environmental conditions) that may have an effect (e.g., on the image appearance) on the data provided by image capture component 130.

In some implementations, sensing component 160 (e.g., one or more of sensors) may comprise devices that relay information to processing component 110 via wired and/or wireless communication. For example, sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, various components of system 100 may be combined and/or implemented or not, as desired or depending on the application or requirements. In one example, processing component 110 may be combined with memory component 120, the image capture component 130, video interface component, display component 150, network interface 180, and/or sensing component 160. In another example, processing component 110 may be combined with image capture component 130 with only certain functions of processing component 110 performed by circuitry (e.g., a processor, a microprocessor, a logic device, a microcontroller, etc.) within image capture component 130.

Furthermore, in some embodiments, various components of system 100 may be distributed and in communication with one another over a network 190. In this regard, system 100 may include network interface 180 configured to facilitate wired and/or wireless communication among various components of system 100 over network. In such embodiments, components may also be replicated if desired for particular applications of system 100. That is, components configured for same or similar operations may be distributed over a network. Further, all or part of any one of the various components may be implemented using appropriate components of a remote device 182 (e.g., a conventional digital video recorder (DVR), a computer configured for image processing, and/or other device) in communication with various components of system 100 via network interface 180 over network 190, if desired. Thus, for example, all or part of processor 110, all or part of memory component 120, and/or all of part of display component 150 may be implemented or replicated at remote device 182, and configured to perform filtering of video image data as further described herein. In another example, system 100 may a comprise image capture component located separately and remotely from processing component 110 and/or other components of system 100. It will be appreciated that many other combinations of distributed implementations of system 100 are possible, without departing from the scope and spirit of the disclosure.

FIG. 2A-2C show examples of random noise and FPN in video image data in accordance with an embodiment of the disclosure. More specifically, FIGS. 2A-2B show examples of random noise extracted respectively from two consecutive video image frames, and FIG. 2C shows FPN that persists in a sequence of video image frames. In FIGS. 2A-2C, FPN is substantially constant (e.g., does not vary or vary only slightly) overtime (e.g., over consecutive video image frames), whereas random noise may vary randomly with respect to time.

Video image data captured by many image sensors exhibit both random noise and FPN. Whereas many conventional filtering techniques simply model noise present in still or video images as random and unstructured noise, systems and methods disclosed herein advantageously model both a random noise component and a FPN component in video image data to effectively suppress both types of noise therein. In various embodiments, noise that may appear as a result of sensor defects (e.g., response non-uniformity, dead pixels, hot pixels, or other defects) may also be modeled or otherwise considered as part of FPN. Moreover, noise exhibited in still or video images captured by many image sensors is not unstructured noise. Rather, both the random component and FPN component may be correlated. That is, noise pixels in different spatial (e.g., different pixel coordinates) and temporal (e.g., in different frames) locations are not independent of one another, but rather are correlated with each other. Typical noise in video image data may therefore be referred to as "colored" noise, rather than "white" noise.

Such characteristics may be readily observed in power spectral density (PSD) graphs of example noise as shown in FIGS. 3A-3B. More specifically, FIG. 3A shows a PSD graph of an example random noise component and FIG. 3B shows a PSD graph of an example FPN component, both of which are computed and presented with respect to a 32×32 Fourier transform and shown with a direct current (DC) term at the center. As generally known by one skilled in image processing, a PSD graph of white noise shows a substantially same constant value for all coefficients. In contrast, typical example noise in FIGS. 3A-3B is characterized by clear and distinct non-uniform PSD graphs in both random noise and FPN components. For example, the PSD graph of random noise in FIG. 3A shows a larger horizontal correlation, which may typically be due to column noise in many types of image sensors. As may be appreciated, correlations of noise may be analyzed and expressed with respect to other transforms than the Fourier transform, for example, with respect to the discrete cosine transform (DCT), various types of wavelet transforms, or other suitable transforms.

In embodiments of systems and methods disclosed herein, such structured properties (or "coloredness") of typical noise may be modeled for both random noise and FPN components, thereby permitting effective suppression of noise in video image data through a more accurate model of typical noise therein.

In one embodiment, both random noise and FPN components may be modeled as colored Gaussian noise. Experiments performed in connection with the disclosure have revealed that Gaussian distributions may be taken as good approximations for both noise components. In other embodiments, other distributions, such as a Poisson distribution or a Rician distribution, may be used in place of Gaussian distributions.

One example of random noise and FPN components modeled as colored Gaussian noise may be described mathematically as follows. Let $x_i \in X_i \subseteq Z$, $i=1, 2$, be pixel spatial coordinates and $t \in T \subseteq Z$ be a video image frame index (e.g., time index). Also, let $X=X_1 \times X_2$, and $V=X \times T$ denote, respectively, a spatial (e.g., directed to pixels within a video image frame) domain and a spatiotemporal (e.g., directed to a sequence of video image frames) domain. Then, in one example, noisy video data $z:V \rightarrow R$ may be modeled as:

$$z(x_1,x_2,t)=y(x_1,x_2,t)+\eta_{RND}(x_1,x_2,t)+\eta_{FPN}(x_1,x_2,t) \quad \text{(equation 1)}$$

wherein $y: V \rightarrow \mathbb{R}$ is an unknown noise-free video, $\eta_{RND}$: $V \rightarrow \mathbb{R}$ and $\eta_{FPN}: V \rightarrow \mathbb{R}$ are realizations of random and FPN components.

As discussed above, in one embodiment, these two noise components may be assumed and modeled as colored Gaussian noise, $$\eta_{RND} = k_{RND} \otimes \eta_{RND}^{white}, \quad \text{(equation 2)}$$

$$\eta_{FPN} = k_{FPN} \otimes \eta_{FPN}^{white}, \quad \text{(equation 3)}$$

wherein $\eta_{RND}^{white}$ are $\eta_{FPN}^{white}$ white noise factors following independent and identically distributed (i.i.d.) Gaussian distributions such that:

$$\eta_{RND}^{white}(x_1, x_2, t) \sim N(0, \sigma_{RND}^2(t)), \text{ i.i.d. w.r.t. } x_1, x_2 \text{ and independent w.r.t. } t, \quad \text{(equation 4)}$$

$$\eta_{FPN}^{white}(x_1, x_2, t) \sim N(0, \sigma_{FPN}^2(t)), \text{ i.i.d. w.r.t. } x_1, x_2 \text{ but not and independent w.r.t. } t, \quad \text{(equation 5)}$$

wherein $\otimes$ denotes the convolution operator, and $k_{RND}$ and $k_{FPN}$ are equivalent convolution kernels determining power spectral densities of $\eta_{RND}$ and $\eta_{FPN}$ respectively.

In various embodiments, standard deviation values $\sigma_{RND}$ and $\sigma_{FPN}$ may be estimated from video image data as further described herein. Experiments performed in connection with the disclosure have revealed that standard deviation values $\sigma_{RND}$ and $\sigma_{FPN}$, as well as FPN $\eta_{FPN}$ typically vary slowly over time. As such, standard deviation values $\sigma_{RND}$ and $\rho_{FPN}$ may be estimated only sporadically in some embodiments.

More specifically, it may be assumed that:

$$\frac{\partial}{\partial t} \sigma_{RND}(t) \approx 0, \quad \text{(equation 6)}$$

$$\frac{\partial}{\partial t} \sigma_{FPN}(t) \approx 0, \quad \text{(equation 7)}$$

$$\frac{\partial}{\partial t} \eta_{FPN}(x_1, x_2, t) \approx 0, \quad \text{(equation 8)}$$

wherein the approximations of these partial derivatives with respect to t are such that $\sigma_{RND}$, $\sigma_{FPN}$, and $\eta_{FPN}$ may be treated as constant with respect to t within temporal windows that are used by operations (e.g., filtering operations) described herein.

In addition, PSDs of $\eta_{RND}$ and $\eta_{FPN}$ may be assumed to be fixed modulus normalization with respect to corresponding $\sigma_{RND}^2$ and $\sigma_{FPN}^2$. That is, PSDs do not need to be estimated during operations on video image data, but rather may be treated as built-in calibration parameters in some embodiments. As such, in some embodiments, PSDs of $\eta_{RND}$ and $\eta_{FPN}$ may be estimated offline using calibration video images or any other images that may be suitable for calibration purposes, and only need to be re-calibrated periodically or as needed.

In some embodiments, equation 1 may be generalized to incorporate a signal-dependent noise model, by having $\sigma_{RND}$ and $\sigma_{FPN}$ as functions of both y and t. Such functions may be reasonably considered as separable into independent factors as $$\sigma_{RND}(y, t) = \sigma_{RND}^{[space]}(y) \times \sigma_{RND}^{[time]}(t) \text{ and}$$
$$\sigma_{FPN}(y, t) = \sigma_{FPN}^{[space]}(y) \times \sigma_{FPN}^{[time]}(t)$$

In addition, while $\sigma_{RND}$ can be further decomposed into a vertical and a horizontal component, such an anisotropy in noise may be embedded in PSD representations of noise in various embodiments, as further described herein.

It may be noted that some "bad pixels" (e.g., stuck pixels that always show a fixed value or dead pixels that never detect light) may result in impulse noise of extremely low probability, and thus may not be adequately captured by equation 1. However, various embodiments of the disclosure contemplate incorporating simple mean/median operations based on a look-up table or other inexpensive ad-hoc procedures to compensate for such cases.

Figure 4:
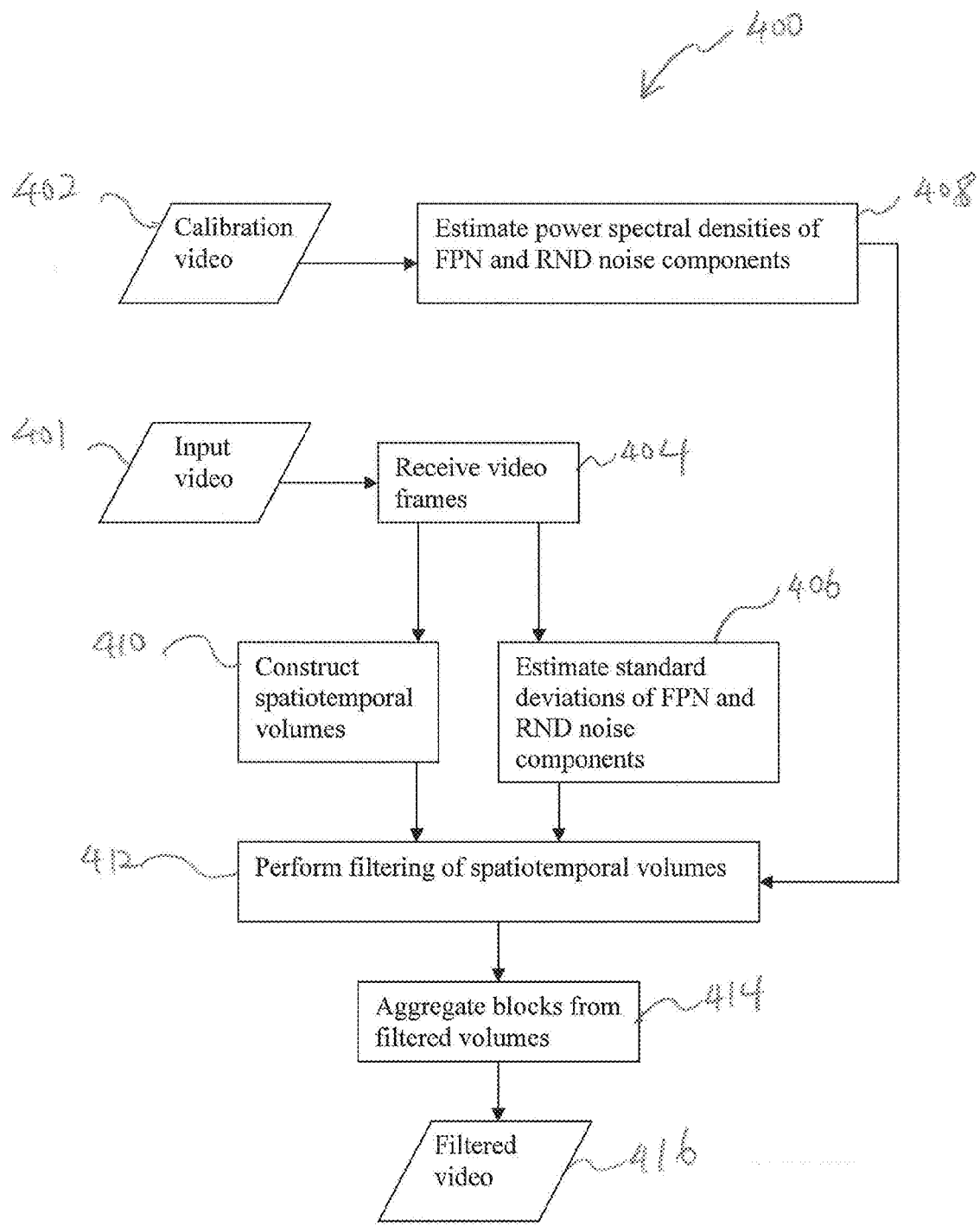
FIG. 4 illustrates a flowchart of a process to suppress noise in video images in accordance with an embodiment of the disclosure.

Having described example noise models and associated noise parameters, such as standard deviation $\sigma_{RND}$, standard deviation $\sigma_{FPN}$, PSD of $\eta_{RND}$, and PSD of $\eta_{FPN}$, that may be utilized in various embodiments of systems and methods of the disclosure, a process 400 to suppress noise in video data in accordance with an embodiment of the disclosure will now be described in connection with FIG. 4. For example, process 400 may be performed by various embodiments of system 100. It should be appreciated that system 100 and various components thereof are identified only for purposes of example, and that any other suitable system may be utilized to perform all or part of process 400.

At operation 404, a plurality of video image frames (e.g., consecutive still images that may be composed to construct moving videos) may be received. For example, video image data (e.g., input video 401) captured or otherwise generated by image capture component 130 or external devices (e.g., generating video data 132) may be received at video interface component 134 and/or processing component 110. In some embodiments, video image data may be processed or otherwise managed to extract a plurality of video image frames therefrom, as needed or desired for particular applications or requirements. For example, video interface component 134 and/or processing component 110 may be configured to extract a plurality of video image frames, which may then be received at processor 110.

At operation 406, standard deviation $\sigma_{RND}$ of random noise component and standard deviation $\sigma_{FPN}$ of FPN component may be estimated using the video image frames. For example, standard deviation $\sigma_{RND}$ of random noise component and standard deviation $\sigma_{FPN}$ of FPN component may be computed, calculated, approximated, or otherwise estimated at processing component 110 of FIG. 1. As discussed above, such parameters may be estimated only sporadically, for example, after filtering or otherwise processing a certain number of video image frames. As such, standard deviation estimation operations may be used within a real-time image processing pipeline if desired. In one embodiment, standard deviation estimation operations may be embedded within, for example, noise filtering module 112. In another embodiment, standard deviation estimation operations may be implemented in a standalone module.

In various embodiments, standard deviation $\sigma_{RND}$ of random noise component may be estimated by performing a temporal high-pass filtering of the video, and calculating a median of absolute deviations (MAD) of the temporal high-pass version of the video. For example, in one embodiment, temporal high-pass filtering may be performed by obtaining the differences between one video image frame and another video image frame delayed by one frame. MAD calculations may then be performed on the temporal high-pass version of the video to obtain a robust estimation of standard deviation $\sigma_{RND}$. In other embodiments, standard deviation $\sigma_{RND}$ may be estimated in a three-dimensional (3-D) transform domain (e.g., transformed by applying a decorrelating transform for filtering as further described herein), where coefficients representing the highest temporal frequency, or some frequency higher than a threshold value, may be used as samples for MAD calculation. It is also contemplated that other known methods for temporal high-pass filtering of video image data and/or other known methods for estimating a standard deviation, may be adapted to be used with process 400.

In various embodiments, standard deviation $\sigma_{FPN}$ may be obtained from the estimated standard deviation $\sigma_{RND}$ and an estimation of total standard deviation of both FPN and random noise components. In one embodiment, standard deviation $\sigma_{FPN}$ may be computed as:

$$\sigma_{FPN}^2 = \sigma_{RND+FPN} - \sigma_{RND}^2, \quad \text{(equation 9)}$$

wherein $\sigma_{RND+FPN}$ is a total standard deviation of both FPN and random components. In other embodiments, standard deviation $\sigma_{FPN}$ may be computed using other statistical criteria (e.g., maximum-likelihood) for estimating standard deviation $\sigma_{FPN}$ given standard deviation $\sigma_{RND+FPN}$ and standard deviation $\sigma_{RND}$.

In various embodiments, total standard deviation $\sigma_{RND+FPN}$ may be estimated by performing a spatial high-pass filtering of the video, and calculating a MAD of the spatial high-pass version of the video. For example, in one embodiment, spatial high-pass filtering may be performed by obtaining the differences between a video image frame and the video image frame shifted by one pixel. MAD calculations may then be performed on the spatial high-pass version of the video to obtain a robust estimation of standard deviation $\sigma_{RND+FPN}$ which in turn can be used to obtain a robust estimation of $\sigma_{FPN}$ as described above. In other embodiments, standard deviation $\sigma_{RND+FPN}$ may be estimated in a three-dimensional transform domain (e.g., transformed using a decorrelating transform for filtering as further described herein), where coefficients representing the highest spatial frequency, or some frequency higher than a threshold value, may be used as samples for MAD calculation. It is also contemplated that other known methods for spatial high-pass filtering of video image data and/or other known methods for estimating a standard deviation, may be adapted to be used with process 400.

At operation 408, power spectral densities (PSD) of a random noise component $\eta_{RND}$ and a FPN component $\eta_{FPN}$ may be estimated using calibration video 402 or any other video images that may be used for calibration purposes. As discussed above, PSDs of $\eta_{RND}$ and $\eta_{FPN}$ may be considered to be constant modulus normalization of $\sigma_{RND}$ and $\sigma_{FPN}$. As such, in some embodiments, operation 408 may be performed offline and/or only periodically (e.g., when recalibration may be desired or needed). In some embodiments, calibration video 402 may provide substantially uniform video images (e.g., provided by capturing images of a closed shutter, a substantially uniform blackbody, a substantially uniform background, or other similar images) such that noise present in calibration video 402 may be more effectively distinguished from true images. In other embodiments, estimation of PSDs may be performed using any video that contains noise distributed and correlated as typical for an image sensor that captures video images to be filtered by process 400.

In some embodiments, PSDs of a random noise component $\eta_{RND}$ and a FPN component $\eta_{FPN}$ may be computed by performing an autocorrelation operation on calibration video 402. In other embodiments, other suitable techniques for computing PSDs may be adapted to be used for operation 408.

In some embodiments, an actual pattern of FPN in the video image frames may be dynamically estimated, in addition to or in place of various statistical parameters associated with the FPN (e.g., a PSD $\eta_{FPN}$ and a standard deviation $\sigma_{FPN}$ of the FPN estimated as described herein). For one or more embodiments, the dynamically estimated FPN pattern may be subtracted from the video image frames, and from the resulting video image frames a PSD of the residual FPN (e.g., FPN remaining in the video image frames after the dynamically estimated FPN pattern is subtracted) and/or other noise may be estimated online (e.g., using the received video image frames) as opposed to being estimated offline (e.g., using calibration video 402). Such online estimation of the PSD of the residual FPN or other noise may enable noise filtering that is robust against modeling imprecisions and inaccuracies, for example.

At operation 410, spatiotemporal volumes (e.g., containing image blocks extracted from different temporal positions, such as from different video image frames) may be constructed from image blocks (e.g., image patches such as fixed-size patches or portions of a video image frame) extracted from video image frames. In various aspects of process 400, filtering and/or other processing operations may be performed on the constructed spatiotemporal volumes.

In various embodiments, spatiotemporal volumes may be constructed by extracting and stacking together image blocks from a sequence of video image frames along a motion trajectory. For example, if 8×8 image blocks are utilized in an embodiment, the constructed spatiotemporal volume may have size 8×8×N, where N is a length of a trajectory (e.g., a number of video image frames) along which motion is tracked. In some embodiments, motion trajectories may be determined by concatenating motion vectors obtained by, for example, block-matching techniques or any other suitable motion or optical flow estimation techniques. Motion vectors may be either computed from the received video image frames, or, when input video 401 is a coded video, motion vectors embedded in the coded video may be utilized. In some embodiments, the motion vectors may be utilized to assess the quality of various dynamic (e.g., instantaneous or online) estimates associated with FPN described above.

Figure 5:
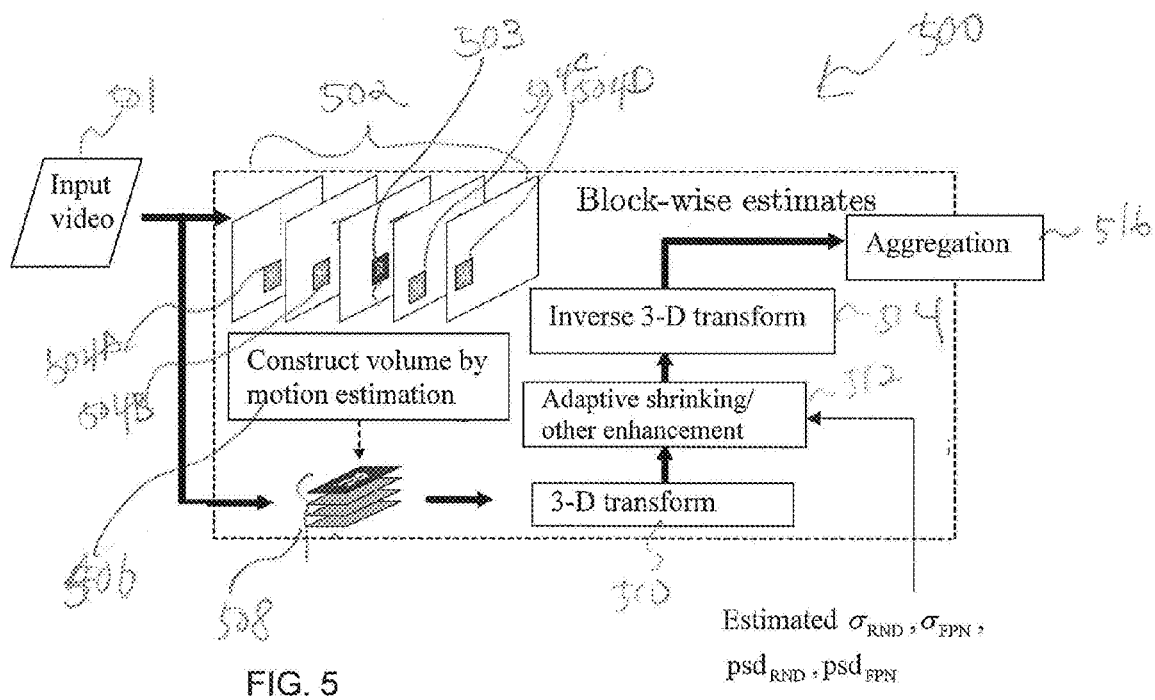
FIG. 5 illustrates a flowchart of a process to construct and filter spatiotemporal volumes to suppress noise in video images in accordance with an embodiment of the disclosure.
Figure 6:
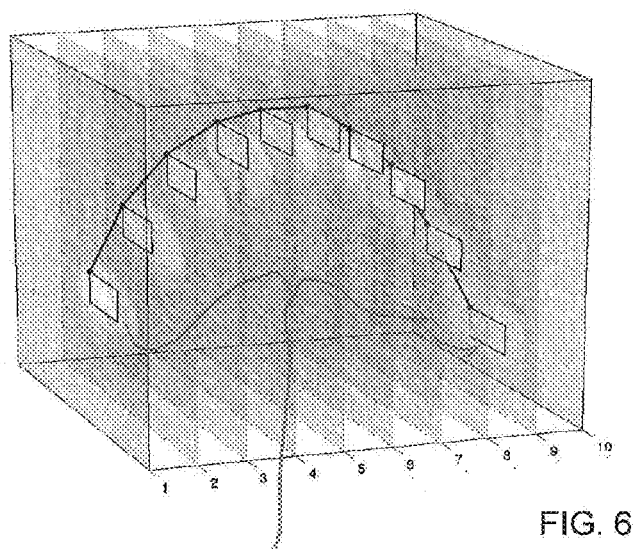
FIG. 6 illustrates an example of a motion trajectory along which image blocks may be extracted to construct a spatiotemporal volume in accordance with an embodiment of the disclosure.

Briefly referring to FIGS. 5 and 6, examples of constructing spatiotemporal volumes are further described. FIG. 5 shows a process 500 to construct and filter a spatiotemporal volume 508 to suppress noise in an input video 501 in accordance with an embodiment of the disclosure. For example, process 500 may be performed as part of process 400 of FIG. 14, such as at operations 410-414. FIG. 6 shows an example of a motion trajectory along which image blocks are extracted to construct a spatiotemporal volume in accordance with an embodiment of the disclosure.

As described above, block-matching techniques may be used in some embodiments to construct spatiotemporal volumes. For example, at operation 506, spatiotemporal volume 508 may be constructed using a block-matching technique. That is, a plurality of video image frames 502 may be examined to search for image blocks 504A-504D matching (e.g., meeting a certain similarity criterion) a reference image block 503. Such image blocks 503, 504A-504D may define a motion trajectory, and may be stacked together to construct spatiotemporal volume 508. Note that operations enclosed in the dashed line (e.g., including operations 506, 510-514) may be repeated for each reference image block to construct and filter a plurality of spatiotemporal volumes. In another example, image blocks 602A-602J in FIG. 6 may be selected as defining a motion trajectory using various motion estimation techniques. As such, images blocks 602A-602J may be extracted and stacked together to form a spatiotemporal volume of length 10, for example.

As can be seen in FIGS. 5 and 6, a spatiotemporal volume may comprise image blocks that may correspond to various different spatial positions on a video image. In such a case, FPN may appear substantially as random noise (e.g., not fixed to specific pixel positions because image block positions change), which may allow FPN to be modeled and filtered as such. If, however, there is little or no motion, all or a substantial portion of FPN may be preserved in the spatiotemporal volume, and as such, may be filtered based substantially on noise parameters associated with FPN. Thus, how much of FPN may be captured as random noise or preserved as FPN in spatiotemporal volumes may depend on the relative alignment of image blocks (e.g., how many of the image blocks in a spatiotemporal volume are aligned and how many of them are from other spatial locations).

Referring back to FIG. 4, at operation 412, the constructed spatiotemporal volumes may be filtered (e.g., to suppress noise or to perform other processing as further described herein with regard to operation 512). In various embodiments, the filtering may be based at least in part on one or more noise parameters. For example, in some embodiments, the filtering may be based at least in part on standard deviation $\sigma_{RND}$ of a random noise component, standard deviation $\sigma_{FPN}$ of a FPN component, PSD of a random noise component, and/or PSD of a FPN component, any one of which may be computed, calculated, approximated, or otherwise estimated at operations 406 and 408. In some embodiments, the filtering may be further adaptive to other characteristics of the constructed spatiotemporal volumes, as further described herein.

In some embodiments, filtering may be performed on 3-D transform domain representations (which may also be referred to as 3-D spectra) of the spatiotemporal volumes. For example, referring again to FIG. 5, filtering operations may include applying a three-dimensional (3-D) transform to the spatiotemporal volumes to obtain 3-D spectra (e.g., at operation 510), modifying (e.g., adaptively shrinking) coefficients of the 3-D spectra (e.g., at operation 512), and applying an inverse transform to obtain filtered spatiotemporal volumes (e.g., at operation 514). It is also contemplated that other forms of regularization such as weighted averaging or diffusion may be performed in place of or in addition to operations 510-514.

More specifically, at operation 510, a decorrelating 3-D transform may be applied to the spatiotemporal volumes. Such a decorrelating 3-D transform may include a discrete cosine transform (DOT), discrete sine transform (DST), discrete wavelet transform (DWT), discrete Fourier transform (DFT), or any other appropriate transform (e.g., separable, orthogonal transforms) that typically decorrelate image signals. In one embodiment, a DCT may be utilized for the transform operation.

A decorrelating 3-D transform may be applied by a separable cascaded composition of lower dimensional transforms. For example, for spatial decorrelation, a 2-D transform (e.g., a separable DCT of size 8×8) may be applied to each of the image blocks (e.g., having a size of 8×8) stacked in the spatiotemporal volume, and for the temporal decorrelation, a 1-D transform of length N (e.g., a 1-D DCT of length matching the length of the spatiotemporal volume) may be applied. As may be appreciated by one skilled in the art, the order of these two cascaded transforms may be reversed, leading to an identical result.

Figure 7:
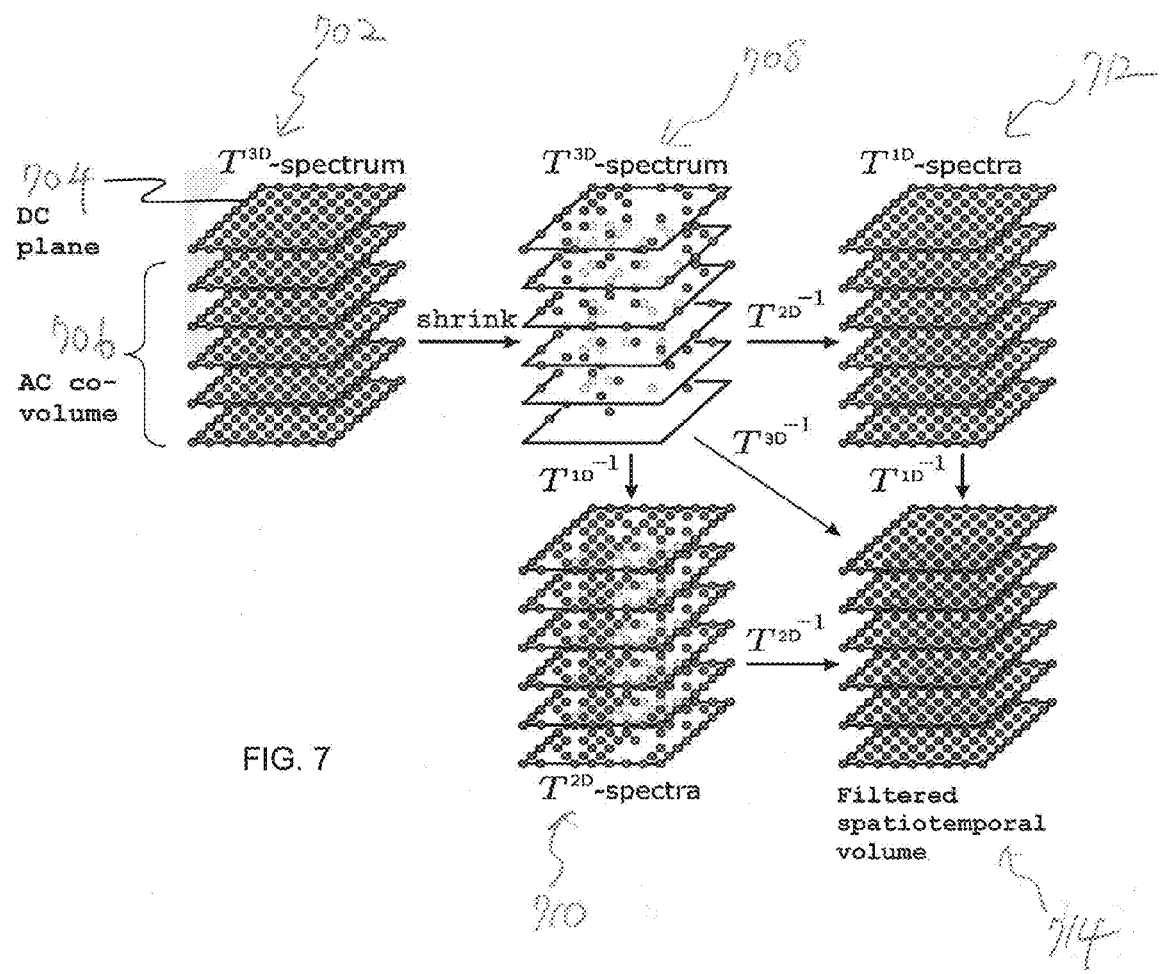
FIG. 7 illustrates a visual representation of filtering on a three dimensional (3-D) spectrum of a spatiotemporal volume in accordance with an embodiment of the disclosure.
Figure 8:
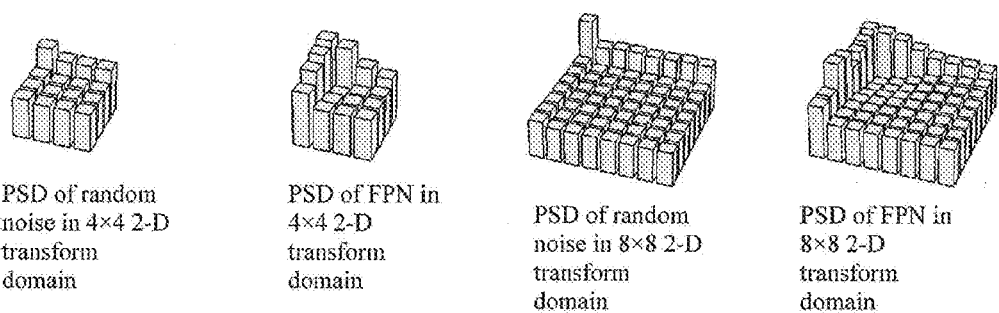
FIG. 8 illustrates various two-dimensional (2-D) transform representations of examples of power spectral densities of random noise and FPN components in accordance with an embodiment of the disclosure.

Referring also to FIG. 7, a resulting 3-D spectrum 702 may comprise a plurality of spectral coefficients (shown as small circles in FIG. 7) representing the spatiotemporal volume in the 3-D transform domain. 3-D spectrum 702 may also include a direct current (DC) plane 704 and an alternating current (AC) co-volume 706. DC plane 704 may be viewed as a collection of DC-terms, which may refer to transform domain coefficients that correspond to zero frequency and may represent an averaging of values. In this regard, the DC-terms in DC plane 704 may encode information about the FPN component. As such, in some embodiments, filtering operations may be adjusted based on which plane (e.g., DC plane or AC co-volume) the coefficients belong to, as further described herein. AC co-volume 706 may be viewed as other remaining coefficients, which typically satisfy some type of orthogonal relationship with the coefficients in DC-plane 704. It should be noted that FIG. 7 is merely a visual presentation provided for purposes of explaining filtering operations on a 3-d spectrum, and as such, the depiction of the location, size, and/or shape of 3-D spectrum 702, DC plane 704, AC co-volume 706 should not be understood as limiting a resulting 3-D spectrum.

At operation 512 of FIG. 5, shrinking (or shrinkage) may be performed to modify the coefficients of the 3-D spectrum (e.g., 3-D spectrum 702), thereby obtaining a shrunk 3-D spectrum 708. Shrinking may include thresholding (e.g., hard thresholding, soft thresholding, or others), scaling, Wiener filtering, or other operations suitable for regularizing signals in a transform domain. In various embodiments, shrinking modifies the spectral coefficients based on corresponding coefficient standard deviations of noise that may be embedded in each spectral coefficient. Thus, for example, in one embodiment, shrinking may be performed by hard thresholding the spectral coefficients based on the corresponding coefficient standard deviations (e.g., setting a value to 0 if it does not meet a threshold value). In another example, shrinking may be performed in two or more stages, in which thresholding may be performed in earlier stages to provide an estimate to Wiener filtering performed in later stages.

The coefficient standard deviation may be approximated, calculated, or otherwise obtained based on various parameters associated with a random noise component and a FPN component that may be present in video images. For example, in one embodiments, the coefficient standard deviation may be approximated based at least in part on standard deviation $\sigma_{RND}$ of a random noise component and standard deviation $\sigma_{FPN}$ of a FPN component.

In another embodiment, the coefficient standard deviation may be approximated based further on a PSD of a random noise component and a PSD of a FPN component, in addition to standard deviation $\sigma_{RND}$ and standard deviation $\sigma_{FPN}$. As described above with respect to modeling of noise in FIGS. 2A-3B and equations 1-5, these PSDs may encode correlation or structure of the noise components. Thus, if computed with respect to the 2-D transform used for spatial decorrelation, these PSDs may additionally provide variances of the random noise component and the FPN component for each of the coefficients in the 2-D spectra prior to the application of the 1-D transform for temporal decorrelation. Such properties of the PSDs may be better visualized or understood through FIG. 8, which shows example graphical representations of PSDs of random noise and FPN components computed with respect to a 2-D transform used for spatial decorrelation.

In various embodiments, one or more of these and other noise parameters may be based on estimated values (e.g., estimated online and/or offline as part of process 400). For example, the coefficient standard deviation may be approximated based on standard deviation $\sigma_{RND}$, standard deviation $\sigma_{FPN}$, a PSD of random noise component and/or a PSD of a FPN component, all or some of which may be estimated values obtained through operations 406 and 408 of FIG. 4 described above.

The coefficient standard deviations may be further adapted, refined, or otherwise adjusted based on the motion captured in the spatiotemporal volumes, in addition to being approximated or calculated based on noise parameters as discussed above. That is, in accordance with various embodiments of the disclosure, it has been observed that the relative alignment of image blocks grouped in spatiotemporal volumes affects how a FPN component is manifested in spectral coefficients. For example, in one extreme case in which all image blocks are aligned (e.g., when there is no motion), the FPN component may be same across all image blocks. As such, the FPN component may simply accumulate through averaging, and thus constitute a substantial part of the content, rather than noise, of the DC plane in the 3-D spectrum. In the other extreme case in which all image blocks are from various different spatial positions of video images, the FPN component may present different patterns over the different image blocks. As such, restricted to the spatiotemporal volume, the FPN component may appear as another random noise component.

Accordingly, in some embodiments, the coefficient standard deviations may not only be approximated based on the noise parameters, but they may also be adapted, refined, or otherwise adjusted based further on the size of the spatiotemporal volume, the relative spatial alignment of images blocks associated with the spatiotemporal volume, and/or the position of coefficients within the 3-D spectrum (e.g., whether the coefficients lie on the DC plane or the AC co-volume). In one embodiment, such an adaptive approximation of the coefficient standard deviations may be obtained using a formulation that encompasses the two extreme cases and at the same time offers a gradual transition for intermediate cases.

One example of such a formulation may be described formally as follows. For a spatiotemporal volume of temporal length N, let $L_n \leq N$, $1 \leq n \leq N$, be the number of image blocks forming the spatiotemporal volume sharing the same original spatial position as the n-th block in the volume. Let $L = \max_{1 \leq n \leq N} \{L_n\}$ (an alternative different definition, which can be more practical depending on the specific filter implementation, may be $L = L_1$). The coefficient standard deviations may then be approximated, for the coefficients in the temporal DC plane and its complementary AC co-volume as:

$$\sigma_{DC} = \sqrt{\sigma_{RND}^2 psd_{RND}^{2D_T} + \frac{L^2 + N - L}{N} \sigma_{FPN}^2 psd_{FPN}^{2D_T}}, \quad \text{(equation 10)}$$

$$\sigma_{AC} = \sqrt{\sigma_{RND}^2 psd_{RND}^{2D_T} + \frac{N - L}{N} \sigma_{FPN}^2 psd_{FPN}^{2D_T}}, \quad \text{(equation 11)}$$

wherein $\sigma_{DC}$ and $\sigma_{AC}$ are the coefficient standard deviations for coefficients in the DC plane and in the AC co-volume, respectively, and wherein $psd_{RN}^{2DT}$ and $psd_{FPN}^{2DT}$ are the PSDs of FPN and random noise components with respect to the 2-D spatial decorrelating transform. Thus, by modifying the spectral coefficients using $\sigma_{DC}$ and $\sigma_{AC}$ obtained from equations 10 and 11, an embodiment of the disclosure may perform adaptive shrinking that may permit near-optimal filtering of noise in video images. Note that the abovementioned extreme cases are obtained in equations 10 and 11 with L=N (no motion) or L=0 (image blocks all from different spatial positions), respectively.

Further, at operation 512, other operations may also be performed on the shrunk 3-D spectra (e.g., shrunk 3-D spectrum 708) for further processing or manipulation. For example, in one embodiment, the spectral coefficients may be further modified using collaborative α-rooting or other techniques that sharpen and/or enhance the contrast in images by boosting appropriate ones of the spectral coefficients. In other examples, image restoration, deblurring, sharpening, equalization, super-resolution, or other operations may be performed to further modify the coefficients of the shrunk 3-D spectra. Whereas inaccurately modeled and/or sub-optimally suppressed noise often render enhancement and other operations ineffective, or worse, cause enhancement and other operations to degrade rather than improve images, near-optimal suppression of noise that may be achieved by embodiments of the disclosure may beneficially improve the efficacy of enhancement and other operations, as further illustrated herein.

At operation 514, the inverse of the decorrelating 3-D transform may be applied to the shrunk 3-D spectra to obtain filtered spatiotemporal volumes (e.g., a filtered spatiotemporal volume 714). As shown in FIG. 7, cascaded separable inverse 2-D and 1-D transforms may be applied in any order (e.g., with intermediate 2-D spectra 710 or intermediate 1-D spectra 712) to obtain filtered spatiotemporal volume 714.

At operation 414/516, image blocks from the filtered spatiotemporal volumes may be aggregated using appropriate aggregation techniques to generate filtered video image frames (e.g., filtered video 416). For example, in various embodiments, aggregation may include weighted averaging of image blocks. In some embodiments, weights for averaging may be based in part on the coefficient standard deviation. In such embodiments, the aggregating operation may benefit from the adaptive approximation of the coefficient standard deviations described above for operation 512. It may be appreciated that other operations associated with processes 400 and 500 may also benefit from the adaptivity provided by embodiments of the disclosure, if such operations are based in part on the coefficient standard deviations.

Figure 9:
FIG. 9 illustrates an example of an input video image frame captured by an infrared imaging sensor in accordance with an embodiment of the disclosure.

Referring now to FIG. 9-11B, examples of advantageous results that may be obtained by embodiments of the disclosure are illustrated and compared with results obtained by conventional techniques. FIG. 9 shows an example of an input video image frame captured by an infrared imaging sensor. The input video image frame of FIG. 9 exhibits both correlated random noise and correlated FPN. FIG. 10A shows an example of a resulting video image frame obtained by processing the input video image of FIG. 9 using a conventional noise filtering technique. More specifically, the conventional technique utilized to obtain FIG. 10A assumes conventional additive white Gaussian noise (AWGN) model. That is, unlike various embodiments of the disclosure, there is no modeling of noise correlation/structure or modeling of separate FPN and random noise components. In FIG. 10A, this leads to ineffective noise suppression, with residual FPN and visible structured artifacts clearly visible from the resulting video image frame.

Figure 10A:
FIG. 10A illustrates an example of a resulting video image frame filtered using a conventional technique.
Figure 10B:
FIG. 10B illustrates an example of a resulting video image frame filtered and enhanced using a conventional technique.

Furthermore, in an example in FIG. 10B of a resulting video image frame obtained by filtering and enhancing the input video image frame of FIG. 9 using conventional techniques, performing an enhancement (e.g., sharpening and/or contrast enhancement) operation on the conventionally filtered video image frame lead to a degradation, rather than an improvement, of the video image frame, with noise being exacerbated rather than being attenuated.

Figure 11A:
FIG. 11A illustrates an example of a resulting video image frame filtered in accordance with an embodiment of the disclosure.
Figure 11B:
FIG. 11B illustrates an example of a resulting video image frame filtered and enhanced in accordance with an embodiment of the disclosure.

In contrast, in an example in FIG. 11A of a resulting filtered video image frame obtained by filtering the input video image of FIG. 9 according to an embodiment of the disclosure, both FPN and random noise components are effectively suppressed with no structured artifacts in the resulting video image. Further, advantages of accurate modeling and filtering of noise may be appreciated even more in FIG. 11B, which shows an example of a resulting video image frame obtained by filtering and enhancing the input video image of FIG. 9 in accordance with an embodiment of the disclosure.

Therefore, embodiments of methods and systems disclosed herein may permit effective suppression of noise even in images that have a prominent FPN component, by modeling noise more accurately, estimating one or more noise parameters, filtering images based on motion-adaptive parameters, and/or performing other operations described herein. The embodiments of methods and systems disclosed herein may also beneficially suppress residual FPN that may still remain after conventional FPN compensation procedures, such as a column noise compensation technique, FPN removal based on pre-calibrated or dynamically estimated FPN masks, and/or other techniques, have been performed. Thus, for example, embodiments of methods and systems disclosed herein may be included in or implemented as various devices and systems that capture and/or process video or still images impaired by noise (e.g., video or still images captured by infrared image sensors or other sensors operating at a low signal-to-noise ratio regime, and/or video or still images processed by conventional FPN compensation techniques) to beneficially improve image quality.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
receiving a plurality of video image frames;
constructing a plurality of spatiotemporal volumes by stacking together a plurality of image blocks extracted from same or different spatial positions on different video image frames along a trajectory of estimated motion from the video image frames;
filtering the spatiotemporal volumes, wherein the filtering models both a random noise (RND) component and a fixed pattern noise (FPN) component in the video image frames to suppress both types of noise, and wherein the filtering is adaptively performed based at least on the estimated motion captured in each spatiotemporal volume to suppress the FPN component; and
aggregating the image blocks from the filtered spatiotemporal volumes to generate a plurality of filtered video image frames.

2. The method of claim 1, wherein each of the image blocks is a fixed-size patch extracted from a corresponding one of the video image frames.

3. The method of claim 1, wherein the video image frames are thermal video image frames.

4. The method of claim 1, further comprising determining the trajectory of the estimated motion from a sequence of the video image frames.

5. The method of claim 1, wherein the filtering of the spatiotemporal volumes further comprises:
applying a decorrelating transform to the spatiotemporal volumes to generate corresponding three dimensional (3-D) spectra, wherein each 3-D spectrum comprises a plurality of spectral coefficients for a transform domain representation of a corresponding one of the spatiotemporal volumes;
modifying at least some of the spectral coefficients in each of the 3D spectra based at least in part on one or more noise parameters that model both the RND and the FPN components; and
applying, to the 3D spectra, an inverse transform of the decorrelating transform to generate the filtered spatiotemporal volumes.

6. The method of claim 5, further comprising:
estimating a standard deviation of the RND component and a standard deviation of the FPN component in the video image frames; and
approximating coefficient standard deviations using at least the standard deviation of the RND component and the standard deviation of the FPN component,
wherein the one or more noise parameters comprise the coefficient standard deviations, and
wherein the modifying comprises shrinking the at least some of the coefficients based on the corresponding coefficient standard deviations.

7. The method of claim 6, wherein:
the standard deviation of the RIND component is estimated using a median absolute deviation (MAD) of a temporal high-pass version of the video image frames; and
the standard deviation of the FPN component is estimated using the standard deviation of the RND component and a MAD of a spatial high-pass version of the video image frames.

8. The method of claim 6, further comprising estimating a power spectral density (PSD) of the RND component and a PSD of the FPN component, wherein the coefficient standard deviations are approximated based further on the PSD of the RND component and the PSD of the FPN component.

9. The method of claim 8, wherein the approximating the coefficient standard deviations is based further on a size of the corresponding spatiotemporal volume, a relative spatial alignment of blocks associated with the corresponding spatiotemporal volume, and/or positions of the corresponding spectral coefficients within the corresponding 3-D spectrum so as to adjust the coefficient standard deviations based at least on the estimated motion.

10. The method of claim 5, further comprising:
estimating a FPN pattern in the video image frames; and
subtracting the estimated FPN pattern from the video image frames, wherein the subtracting is performed prior to, during, or after the filtering of the spatiotemporal volumes.

11. The method of claim 5, wherein the aggregating the image blocks is based at least in part on the coefficient standard deviations.

12. The method of claim 5, further comprising modifying the spectral coefficients of the 3-D spectra to sharpen and/or improve contrast of the video image frames.

13. A system comprising:
a video interface configured to receive a plurality of video image frames;
a processor in communication with the video interface and configured to:
construct a plurality of spatiotemporal volumes by stacking together a plurality of image blocks extracted from same or different spatial positions on different video image frames along a trajectory of estimated motion from the video image frames,
filter the spatiotemporal volumes, wherein the filtering models both a random noise (RND) component and a fixed pattern noise (FPN) component in the video image frames to suppress both types of noise, and wherein the filtering is adaptively performed based at least on the estimated motion captured in each spatiotemporal volume to suppress the FPN component, and
aggregate the image blocks from the filtered spatiotemporal volumes to generate a plurality of filtered video image frames; and
a memory in communication with the processor and configured to store the video image frames.

14. The system of claim of claim 13, wherein each of the image blocks is a fixed-size patch extracted from a corresponding one of the video image frames.

15. The system of claim 13, further comprising an image capture device configured to capture images of a scene, wherein the video image frames are provided by the image capture device.

16. The system of claim 15, wherein the image capture device is an infrared camera configured to capture thermal images of the scene.

17. The system of claim 13, wherein the processor is configured to determine the trajectory of the estimated motion from a sequence of the video image frames.

18. The system of claim 13, wherein the processor is configured to:
apply a decorrelating transform to the spatiotemporal volumes to generate corresponding three dimensional (3-D) spectra, wherein each 3-D spectrum comprises a plurality of spectral coefficients for a transform domain representation of corresponding one of the spatiotemporal volumes;
modify at least some of the spectral coefficients in each of the 3D spectra based at least in part on one or more noise parameters that model both the RND and the FPN components; and
apply, to the 3D spectra, an inverse transform of the decorrelating transform to generate the filtered spatiotemporal volumes.

19. The system of claim 18, wherein the processor is further configured to:
estimate a standard deviation of the RND component and a standard deviation of the FPN component in the video image frames; and
approximate coefficient standard deviations using at least the standard deviation of the RND component and the standard deviation of the FPN component,
wherein the one or more noise parameters comprise the coefficient standard deviations, and
wherein the modifying comprises shrinking the at least some of the coefficients based on the corresponding coefficient standard deviations.

20. The system of claim 19, wherein the processor is configured to:
estimate the standard deviation of the RND component using a median absolute deviation (MAD) of a temporal high-pass version of the video image frames; and
estimate the standard deviation of the FPN component using the standard deviation of the RND component and a MAD of a spatial high-pass version of the video image frames.

21. The system of claim 19, wherein:
the processor is further configured to estimate estimating a power spectral density (PSD) of the RND component and a PSD of the FPN component; and
the coefficient standard deviations are approximated based further on the PSD of the RND component and the PSD of the FPN component.

22. The system of claim 21, wherein the processor is configured to approximate the coefficient standard deviations based further on a size of the corresponding spatiotemporal volume, a relative spatial alignment of blocks associated with the corresponding spatiotemporal volume, and/or positions of the corresponding spectral coefficients within the corresponding 3-D spectrum so as to adjust the coefficient standard deviations based at least on the estimated motion.

23. The system of claim 18, wherein the processor is configured to:
estimate a FPN pattern in the video image frames; and
subtract the estimated FPN pattern from the video image frames, wherein the estimated FPN component is subtracted prior to, during, or after the spatiotemporal volumes are filtered.

24. The system of claim 18, wherein the processor is configured to aggregate the image blocks based at least in part on the coefficient standard deviations.

25. The system of claim 18, wherein the processor is further configured to modify the spectral coefficients of the 3-D spectra to sharpen and/or improve contrast of the video image frames.

* * * * *